Figure 1:
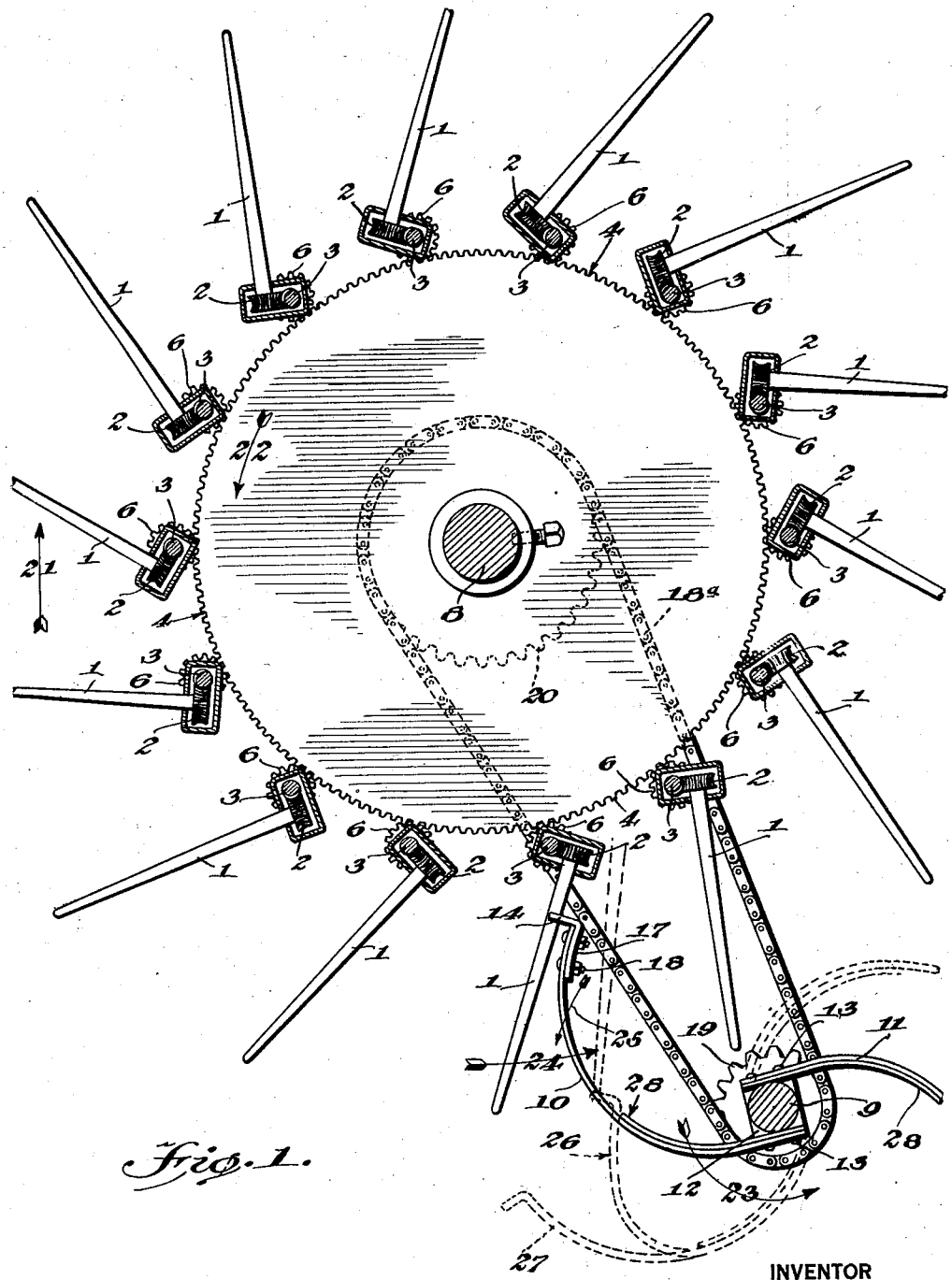

March 18, 1930.  O. F. BLEDSOE, JR  1,751,389
DOFFING DEVICE
Filed Feb. 7, 1928   2 Sheets-Sheet 1

INVENTOR
O. F. Bledsoe, Jr.,
BY
ATTORNEYS

March 18, 1930.　　O. F. BLEDSOE, JR　　1,751,389
DOFFING DEVICE
Filed Feb. 7, 1928　　2 Sheets-Sheet 2
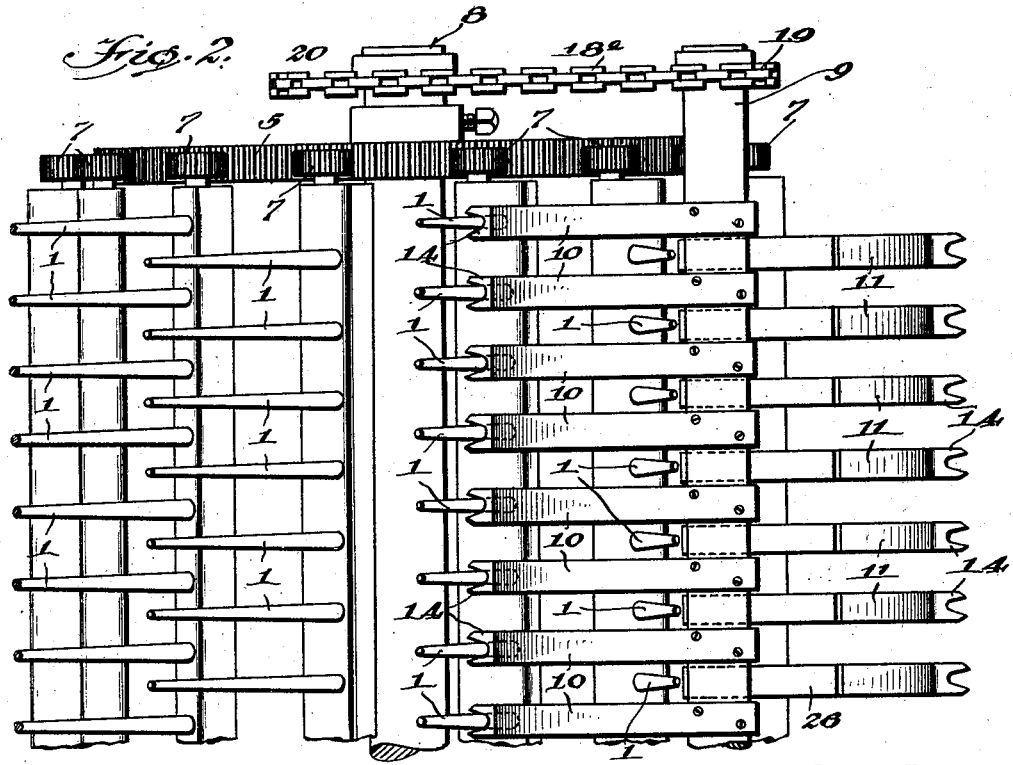
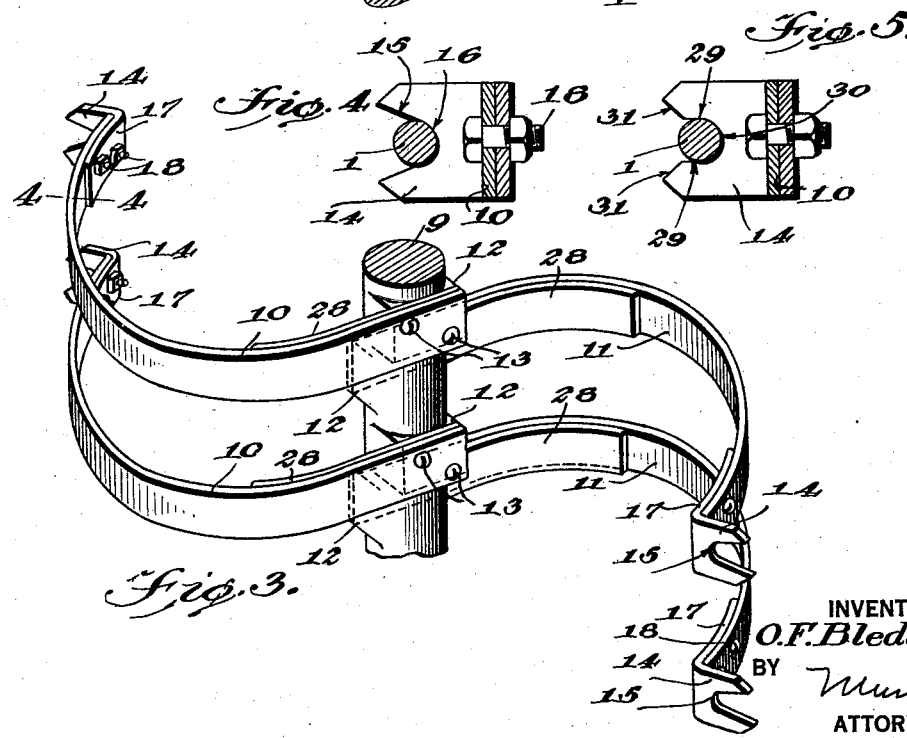
INVENTOR
O. F. Bledsoe, Jr.,
BY
ATTORNEYS Patented Mar. 18, 1930

1,751,389

UNITED STATES PATENT OFFICE

OSCAR F. BLEDSOE, JR., OF GREENWOOD, MISSISSIPPI

DOFFING DEVICE

Application filed February 7, 1928. Serial No. 252,551.

This invention relates to improvements in cotton picking machinery, and it consists of the constructions, combinations and arrangements herein described and claimed.

One of the foremost objects of the invention is to provide a device for stripping or doffing the needles of a cotton picking machine after the former have removed the cotton from the plants and in doing so have picked up the cotton.

Another object of the invention is to pass resilient arms along the revolving needles after the latter have abstracted the cotton from the plants, the resulting scraping action not only stripping the needles of the entwined cotton but also removing any accumulation of gum collected during periodic abrasions of the plant stalks.

Another object of the invention is to utilize the reaction of the resilient arms in throwing off the stripped cotton when said arms depart from the extremities of the needles at the end of a particular stripping action.

A further object of the invention is to so dispose the doffing device in relationship to the so-called picking cylinder of a cotton picking machine that the advance of the revolving needles along a circular path of motion toward the doffing device will impose increasing tension upon the resilient arms of the latter so that the full effect of the reaction of the arms may be gotten when the arms depart from the extremities of the needles for the purpose of throwing off the cotton.

Other objects and advantages of the invention appear in the following specification, reference being had to the accompanying drawings in which;

Figure 1 is a horizontal section of enough of a cotton picking machine to illustrate the application of the invention, Fig. 2 is an elevation of a portion of the so-called needle cylinder and the associated doffing device, Fig. 3 is a detail perspective view of a portion of the doffing device, Fig. 4 is a detail cross section taken on the line 4—4 of Fig. 3, a needle being shown in place for the purpose of illustrating the application of the claw of the resilient arm, Fig. 5 is a detail cross section illustrating a modified form of claw.

Those who are acquainted with cotton picking machinery know that one of the most effective types employs a large number of rapidly revolving needles for the purpose of removing the cotton from the plants. These needles are generally arranged in vertical rows or series circumferentially disposed. The needles of each series are driven by a shaft, there being appropriate driving connections between the two. The resulting construction presents the appearance of what may be called for convenience, a cylinder.

Although cotton pickers of the foregoing type have been found to be highly effective, there is still room for improvement to the extent of devising efficient means for removing the cotton from the needles. Previously used arrangements to carry out the purpose have been demonstrated as being ineffectual at times in at least two respects. First, characteristic arrangements for stripping the needles of cotton are not effectual in removing any collection of gum resulting from the sap collected by the points of the needles upon the periodic and unavoidable abrasion of the plant stalks. Second, known devices for removing the cotton cannot be made to perform efficiently with tapering needles which are preferred over straight-sided needles.

Any doffing device that does not actually scrape the sides of the needles cannot be expected to remove accumulations of gum. Nor can any doffing device that either fits upon or engages the needles loosely be expected to strip off all of the cotton in a clean manner every time. The presence of gum may seriously impede a fairly effective loosely contacting doffing device. In the majority of instances, it is the present custom to employ straight-sided needles in cotton picking machinery, side bars or the like being employed to strip the cotton.

Needles of the latter character are usually slightly tapering at the free extremity over a distance of approximately 1½ inches. It is the tapering points of these needles that abrade the plant stalks at times, and accumulate slight quantities of sap. The sap congeals into gum. Known stripping arrangements cannot reach the tapering sides of the points and therefore are ineffectual in dislodging the gum.

Reference is now made to the drawings. The immediate description is that of a known structure. Reference may be had to the patent to A. Campbell, for cotton harvester, granted October 29, 1901, No. 685,440 for an exemplification of the principle. The needles, indicated 1, are tapering throughout as disclosed in the patent, but unlike the patent, are smooth. Tapering needles are preferred in modern practice, but the known arrangements for stripping cotton are ineffectual with straight-sided needles. Each needle has a worm pinion 2 on the inner end, that is to say, the end nearest the so-called cylinder. Vertical shafts 3 drive the needles, these shafts either carrying worm gears or having worm teeth cut therein at appropriate places to mesh with the pinions 2. Each shaft 3 drives a number of needles, the latter being arranged in vertical series. Large gears 4 and 5, respectively at the bottom and top of the so-called cylinder, mesh with and drive pinions 6 and 7 at the lower and upper ends of the shafts 3.

The gears 4 and 5 are carried by what may here be distinguished as a main shaft 8. The bearings of this shaft, the driving medium therefor, as well as other extraneous structure are omitted from the illustration. It is not material to the effectiveness of the invention whether the needles 1 are rigidly stationed in respect to the cylinder or are capable of limited lateral swinging motion in respect to the shafts 3 during the period of presentation to the cotton plants. The latter function is one of the structure in the foregoing patent. Neither is it material whether the needles assume tangential or radial positions in respect to the cylinder.

The improvement comprises a doffer shaft 9 which carries a plurality of resilient arms 10 and 11, arranged in sets and segregated from each other by virtue of being secured to opposite sides of the shaft. The means by which the arms are secured may comprise any one of a number of mechanical expedients. The means shown comprises bosses 12 to the flat sides of which the arms are applied and fastened at 13.

Each arm is backed by a brace 28 which may either comprise an integral part of the bosses 12 or be affixed between the resilient arms and bosses by the same means that secure the former to the latter. The effect of the braces is to stiffen the base of the arms and render the free ends relatively more flexible. But the more important effect of the braces is to permit flexing or compression of the resilient arms in a direction radially of the shaft 9 as later appears.

The arms are curved in a direction generally opposite to that in which the shaft 9 is turned. Curving of the arms is not necessarily resorted to because other contours may serve the same purpose. A curved contour is preferable, but in any case the extremities or substantial extremities of the arms are fitted with claws 14. Each claw (Fig. 4) has a tapering or V-shaped crotch or recess 15, the apex of which is rounded at 16. The diverging sides of the recess provide an adequate entrance for the needle 1, the flaring nature of the inlet compensating for any slight deviation of either the needle or the arm from a predetermined relative position.

Upon presentation of the claw 14 to a needle 1, the diverging sides of the recess 15 will first engage the heavy or thick part of the needle. As the claw traverses the needle, the tapering formation of the recess 15 will continuously adapt itself to the diminishing or tapering needle until the extremity of the latter is reached, the area of contact of the recess 15 being approximately 50% of the circumference of the needle. The continuously tapering form of needle and V-shaped recess of the claw 14 are complemental to each other.

Provision is made for renewing the claws 14. Each claw includes a short shank 17 which is secured to the extremity of the respective resilient arm as at 18. Any damage to one of the claws is readily remedied by replacing the damaged claw with a new one. The necessity of removing and discarding the entire arm is avoided. Another advantage of the separable claw is that the latter may be made of a material dissimilar to that of the resilient arm. The latter will usually be made of spring steel. It is believed preferable to make the claw 14 of brass, or the like. The contact of a brass claw with a steel needle will diminish the friction without reducing the effectiveness of the scraping action.

A chain 18$^a$ provides a drive for the doffer shaft 9 from the main shaft 8. The respective shafts carry the sprockets 19 and 20 to which the chain is applied. Inasmuch as the doffing device must serve the needle cylinder it is considered preferable to drive the former from the latter in order to establish a co-relationship.

Harmony between the turning of the shafts 8 and 9 must be preserved. The rate of turning of the shaft 9 must be regulated by the number of vertical series of needles. The doffer shaft 9 carries two sets of resilient arms, each set being intended to strip alternate series of needles. Inasmuch as fourteen series of needles are shown it follows that the doffer shaft 9 must make seven revolutions to one of the main shaft 8. In practice the sprockets 19 and 20 must be designed to drive the shaft 9 at the proper ratio of speed.

The foregoing stripping action of a single set of resilient arms upon alternating series of needles presupposes a staggering of the needles in adjacent series. It is proposed to modify the existing structure of the cotton picking machine to the latter extent. It is also necessary to stagger the resilient arms, this being plainly shown in Fig. 2. The needles in a series under subjection of the scraping act by the arms in one of the doffing sets must pass between the spaces of the arms in the other set before moving beyond the jurisdiction of the doffing device.

Mention has been made of straight-sided needles which are used sometimes. Such needles usually have a taper of approximately 1½ inches at the point. The slightly modified form of claw in Fig. 5 is designed for such needles. The crotch or recess 29 has straight parallel edges which are connected by the rounded base 30. The edges join with the flares 31 which provide an enlarged inlet to the recess. The parallel edges 29 of the recess, as well as the rounded base 30 will scrape the surface of a straight-sided needle, the scraping of the tapering points of such needles being confined to the rounded base 30 when the claw arrives at the tapering point.

The operation is readily understood. Attention is directed to Fig. 1. The machine is regarded as travelling in the direction of the arrow 21. The needle cylinder and doffing device are turning in the direction of the arrows 22 and 23. The mechanism shown in Fig. 1 must be regarded by the reader as duplicated on the left side of the arrow 21. The two needle cylinders define a passageway for the cotton plants.

Consider the claw 14 of the arm 10 (Fig. 1) as having received the nearest needle 1. Up to this time, the needle is supposed to be revolving rapidly. It may be regarded as carrying a quantity of cotton entwined thereupon during the aggression of the needle in respect to the cotton plants. While revolving, the needle also traverses a circular path of motion indicated by the arrow 24. The arm 10 is traversing a circular path of motion designated by the arrow 25.

The mutual advance toward each other of the needle 1 and arm 10 results in an increased flexing of the latter until a position substantially as indicated at 26 is arrived at. The flexing of the arm is not permitted to occur throughout the full extent of the arm, the brace 28 being provided to prevent that. The backing afforded by the brace limits the extent of flexure of the arms to a region adjacent to the extremity of the brace, as well indicated by the dotted line position 26. The result is that the claw 14 will be drawn toward the shaft 9 in a substantially radial direction.

The desired action may be well illustrated by noting the difference of flexing the fingers toward the palm of the human hand in a gripping action, from bowing the entire arm and drawing the extended fingers toward the body with a sweeping action. The latter action would result in the doffing device if the resilient arms were unsupported at the back by the braces 28. But the provision of the braces causes the extremities of the resilient arms to flex much on the order of closing the fingers toward the palm of the human hand.

Moreover, the latter action in the doffing device permits the claw 14 to maintain a true position in respect to the needles 1. A substantially right angular relationship of the claw with the axis of each needle will be preserved. In other words, the recess 15 and rounded apex 16 will remain planted more or less squarely against the side of the needles during the entire scraping period. There will be no relative rocking of the claw and attendant wearing out of one or both of the recess edges.

As the foregoing mutual advance of the needle and resilient arms continues, the increasing tension of the latter makes the cleaning of the needle surface absolutely sure.

A banking of the cotton ahead of the claw 14 occurs during the stripping action. As soon as the claw 14 departs from the extremity of the needle 1 the relaxation or reaction of the resilient arm 10 causes the latter to reassume the original shape as indicated at 27. But in doing so, the arm imparts a vigorous flip to the wad of cotton, sending it off to a conveyor or such other receptacle as may be provided.

The perpetual contact of the V-shaped recess 15 with approximately one-half the circumference of the continuously tapering needle 1 ensures the removal of any adhering gum that may have accumulated either at the point or along the body of the needle. It may be stated that, according to the patent mentioned above, the direction of rotation of the needles is reversed after the doffing action has been accomplished. The rate of rotation will be lower, for a predetermined time, until the aggression of the needles commences again, at which time the rotation is set up to the original rate but in the opposite direction.

What has been said in connection with the claw 14 in Fig. 4, applies in the majority of respects to the claw in Fig. 5 also. The latter is adapted to straight-sided needles. The parallel edges 29 and the rounded base 30 may be regarded as simulating the customary parallel-bar and cylindrical doffing arrangement, respectively, now in use. The parallel edges 29 take care of the straight sides of the needles now under consideration, while the rounded base 30 takes care of the tapering point. The result is a clearing of accumulated cotton as well as the removal of any adhering gum.

While the construction and arrangement of the improved doffing device is that of a generally preferred form, obviously modifications and changes may be made without departing from the spirit of the invention or the scope of the claims.

I claim:—

1. A doffing device comprising an arm, a claw carried by the arm, and means for moving the arm to periodically engage the claw with a needle to perform a scraping action.

2. A doffing device comprising a resilient arm, a claw carried by the arm, and means for swinging the arm to periodically engage the claw with a revolving and advancing needle to perform a scraping action.

3. A doffing device comprising a resilient arm having an associated reinforcement confining flexure of the arm to a determined zone, and a claw carried by the arm being periodically engageable with the needle at which time said flexure occurs.

4. A doffing device comprising a resilient arm, a brace located along a portion of the arm confining the flexure of the arm to a predetermined zone beyond said brace, and a claw carried by the arm being periodically engageable with a needle.

5. A doffing device comprising a bowed resilient arm, a brace applied to a portion of the arm inside of the bow to confine the flexure of the arm to a determined zone beyond the end of the brace, and a claw carried by the arm for engagement with a needle at which time said flexure occurs.

6. A doffing device comprising a resilient arm, a shaft upon which the arm is mounted to swing the arm and a separable claw of material dissimilar to that of the arm and to a needle with which the claw is periodically engageable.

7. A doffing device comprising a shaft having a boss, a resilient arm, means by which the resilient arm is attached at one end to the boss, a brace extending from the boss backing the arm over a portion of its length to confine the flexure of the arm to a limited zone, and a claw carried by the other end of the arm having a crotch to receive a needle for performing a scraping action thereupon.

8. A doffing device comprising a shaft, a resilient arm carried thereby and being swung in a circular path, and a claw carried by the arm having a recess with parallel edges and a rounded base, said edges merging with flares.

9. In a cotton picker having a needle accumulating a substance while traversing a prescribed path, a doffing device having a crotch through which the needle advances while traversing a portion of said path to strip off the substance.

10. In a cotton picker having a needle accumulating a substance while traversing a prescribed path, a resilient doffing device straddling the needle during a portion of said path for continuously and increasingly flexing said device to scrape off the substance.

11. In a cotton picker having a needle accumulating a substance while traversing a prescribed path, a resilient doffing device having a crotch adapted to confront the needle while traversing a portion of said path, and means moving said device in a direction contrary to the path of the needle during contact of the needle with the crotch, thus distorting the contour of said device.

12. In a cotton picker having a needle accumulating a substance while traversing a prescribed path, a resilient doffing device having a crotch to receive the needle, means to move the doffing device along the needle when the needle comes into engagement with the doffing device, and means backing the resilient doffing device for limiting the extent of flexure thereof.

13. In a cotton picker having a revolving and travelling needle, and a doffing device moving in a direction contrary to that travelled by the needle and having a crotch, establishing periodic engagements with the needle and mutual scraping actions for the removal of cotton accumulated by the revolution of the needle.

Signed at Greenwood in the county of Leflore and State of Mississippi this 4th day of February, 1928.

OSCAR F. BLEDSOE, JR.